United States Patent
Grammel et al.

(10) Patent No.: US 9,838,248 B1
(45) Date of Patent: Dec. 5, 2017

(54) CONFIDENCE LEVEL INFORMATION FOR NETWORK ALARMS

(71) Applicant: Juniper Networks, Inc., Sunnyvale, CA (US)

(72) Inventors: Gert Grammel, Ditzingen (DE); Hans-Juergen W. Schmidtke, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 286 days.

(21) Appl. No.: 14/575,786

(22) Filed: Dec. 18, 2014

(51) Int. Cl.
*H04L 12/26* (2006.01)
*H04L 12/24* (2006.01)

(52) U.S. Cl.
CPC ................. *H04L 41/0681* (2013.01)

(58) Field of Classification Search
CPC ................................................. H04L 41/0681
USPC ................... 370/216–228, 241–253
See application file for complete search history.

(56) References Cited

U.S. PATENT DOCUMENTS

| | | | | |
|---|---|---|---|---|
| 8,086,729 B1* | 12/2011 | Hindawi | ............. | G06F 11/0709 709/224 |
| 2016/0065736 A1* | 3/2016 | Pedersen | ................ | H04M 3/51 379/266.07 |

\* cited by examiner

*Primary Examiner* — Ricky Ngo
*Assistant Examiner* — Wei-Po Kao
(74) *Attorney, Agent, or Firm* — Shumaker & Sieffert, P.A.

(57) ABSTRACT

The disclosure describes techniques that enable a network device to determine a confidence level for a network alarm and provide information indicative of the confidence level to other devices. For example, a network device may experience any number of conditions that cause the network device to output an alarm. In addition to or instead of simply sending out the alarm, the network device may perform operations to determine a confidence level associated with the alarm. For instance, the network device may determine whether the conditions that caused the alarm continue or whether the conditions can be validated. The network device may output information indicative of the confidence level.

30 Claims, 5 Drawing Sheets

CONFIDENCE LEVEL INFORMATION FOR NETWORK ALARMS

TECHNICAL FIELD

Techniques of the present disclosure relate to managed networks and, more particularly, to management of network devices.

BACKGROUND

Devices in a computer network may be operable to provide status information to one another and/or to other devices, such as devices that manage configuration of the network. The status information may include an indication that a sending network device has encountered a problem. For instance, when a routing device, such as a router, fails to receive a threshold number of acknowledgments of data packets sent via a particular link, the router may determine that the link is down. The router may raise an alarm by sending out status information indicating the link failure. In one example, a network controller may receive the status information and, in response to the link failure, perform a re-optimization process to reconfigure the network. As another example, another network device may receive the status information and determine new paths that do not use the failed link.

In some examples, however, conditions that cause a device to output an alarm may be temporary, erratic, or otherwise unclear. For instance, a sensor unit of a device may malfunction, causing the device to output an alarm erroneously. For example, a temperature sensor may indicate a high temperature although the sensor is still in an operational mode. In another example, a particular router may be configured to determine that a link is down when the link functions incorrectly a threshold amount of the time (e.g., 10 out of 100 times, or other amount). Thus, the router may output an alarm even though the link still has some functionality. Additionally or alternatively, in some cases a link previously determined by a router to be down may return to full functionality, but the router may continue to output an alarm (e.g., for network administrator reference). Various network devices may be configured differently, such as to output alarms based on different conditions, causing confusion for devices and/or administrators that need to analyze and/or react to such alarms. For example, different sensors may have slightly different biases such that one may already send an alarm, while the other sensor is still silent.

SUMMARY

In general, the disclosure describes techniques that enable network devices to determine a confidence level for a network alarm and provide information indicative of the confidence level to other devices. For example, a network device may experience any number of conditions that cause the network device to output an alarm. In addition to or instead of simply sending out the alarm, the network device may perform operations to determine a confidence level for the alarm. For instance, the network device may determine whether the conditions that caused the alarm continue and/or whether the conditions can be validated. The network device may output information indicative of the confidence level, thereby allowing the other devices to respond to alarms in a more efficient and/or informed manner.

In one example a method includes generating, by a network device, a network alarm based on detecting that a network alarm condition of the network device has been satisfied, determining, by the network device, a confidence level associated with the network alarm, and outputting, by the network device, a message comprising information indicative of the network alarm and information indicative of the confidence level.

In another example a network device includes at least one processor; and at least one module operable by the at least one processor to: generate a network alarm based on detecting that a network alarm condition of the network device has been satisfied, determine a confidence level associated with the network alarm, and output a message comprising information indicative of the network alarm and information indicative of the confidence level.

In another example, a computer-readable storage medium includes instructions for causing a programmable processor of a network device to: generate a network alarm based on detecting that a network alarm condition of the network device has been satisfied, determining a confidence level associated with the network alarm, and outputting a message comprising information indicative of the network alarm and information indicative of the confidence level.

In another example, a method includes receiving, by a controller device and from a network device, a message comprising information indicative of a network alarm generated by the network device, determining, by the controller, a confidence level associated with the network alarm, and executing at least one operation based on the alarm and the determined confidence level.

In another example, a controller device includes at least one processor, and at least one module operable by the at least one processor to: receive, by the controller and from a network device, a message comprising information indicative of a network alarm generated by the network device, determine a confidence level associated with the network alarm, and execute operations based on the alarm and the determined confidence level.

The details of one or more examples are set forth in the accompanying drawings and the description below. Other features, objects, and advantages will be apparent from the description and drawings, and from the claims.

DETAILED DESCRIPTION

Figure 1:
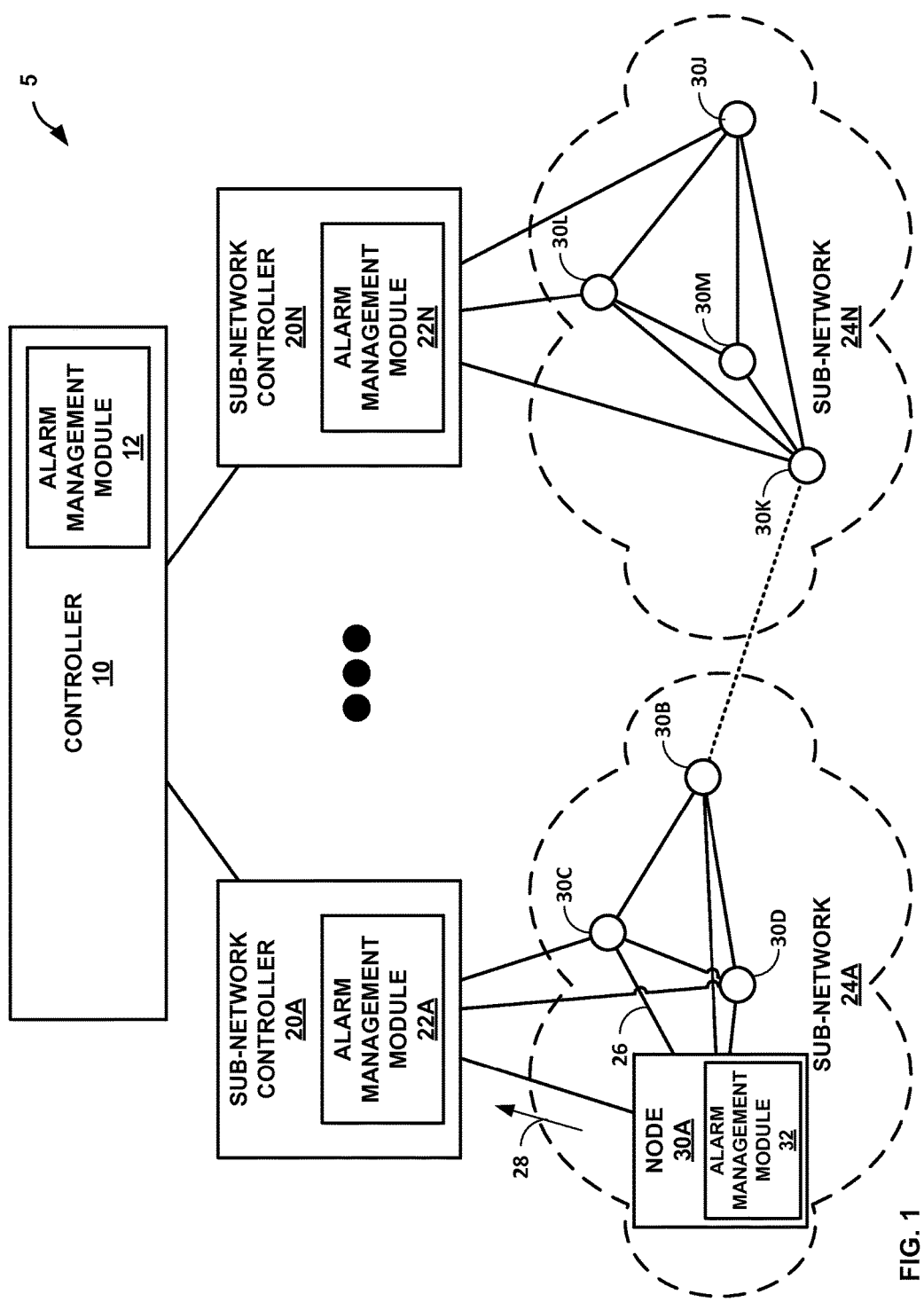
FIG. 1 is a block diagram illustrating an example network system using confidence level information for network alarms in accordance with one or more of the techniques described herein.

FIG. 1 is a block diagram illustrating an example network system 5 that uses confidence level information for network alarms in accordance with one or more of the techniques described herein. As shown in the example of FIG. 1, network system 5 includes controller 10, sub-network controllers 20A-20N (collectively, "sub-network controllers 20"), and nodes 30A-30M (collectively, "nodes 30"). In the example of FIG. 1, network 5 may represent at least a portion of a network, including sub-networks 24A-24N (collectively, "sub-networks 24"). Each of sub-networks 24 may be managed at an intermediate level by a respective one of sub-network controllers 20. Sub-network controllers 20 are, in turn, managed by controller 10.

In the example of FIG. 1, nodes 30 may be, for example, network devices such as routers, switches, hubs, access points, firewalls, or other wired or wireless networking devices. Each of controller 10 and sub-network controllers 20 may represent one or more servers, logical entities representing one or more virtual machines on one or more network devices or other devices capable of managing a plurality of network devices. In some examples, controller 10 and/or sub-network controllers 20 may be implemented on one or more devices running in "the cloud" or in service provider premises, controlling the nodes in one or more of sub-networks 24 with which the controller is associated. Connecting lines or arcs are used to illustrate network connections between two devices. In the example of FIG. 1, nodes 30 may be connected to others of nodes 30 and/or to one of sub-network controllers 20. Sub-network controllers 20 are connected to one or more nodes in the respective one of sub-networks 24, as well as to controller 10. As in the example of FIG. 1, one or more of nodes 30 may, in some examples, not be directly connected to a sub-network controller. That is, in various examples, nodes of a sub-network may communicate with a respective sub-network controller directly, via one or more other devices, or in some other fashion.

Each of nodes 30 may be capable of establishing and maintaining one or more physical links. For instance, node 30A may maintain a physical link with each of nodes 30B, 30C, and 30D, as well as a physical link with sub-network controller 20A. A physical link may represent a wired or wireless connection between two devices. In some examples, one or more of nodes 30 may maintain one or more logical links. A logical link may represent a path through one or more physical links and may enable two devices to communicate as if physically connected. For instance, node 30A may maintain a logical link with node 30K via nodes 30C and 30B. That is, when node 30A sends data to node 30K, node 30A may send the data to node 30C, node 30C may send the data to node 30B, and node 30B may send the data to node 30k or to an intervening node (not shown).

During operation of network system 5, nodes 30 may communicate traffic from one node to the next in accordance with routing information defining various logical links. The routing information may be determined by nodes 30, by sub-network controllers 20, and/or by controller 10. For instance, in one example, nodes 30 may generate their own routing information by exploring the devices around them. In other examples, each of nodes 30 may provide information to a respective sub-network controller from sub-network controllers 20 indicating the node, as well as various other nodes to which the node is physically connected. Sub-network controllers 20 may use this information to determine the best paths through the respective sub-network for various end points. Sub-network controllers 20 may also provide information to controller 10 so that controller 10 may determine the best paths through multiple sub-networks. For instance, controller 10 and/or sub-network controllers 20 may determine that the best path from node 30A to node 30L is via nodes 30C, 30B, and 30K (among others). That is, the path via 30C, 30B, and 30K may provide the most reliable path for data, the fastest path for the data, or satisfy one or more other constraints. Controller 10 and/or sub-network controllers 20 may send data to various ones of nodes 30 and cause the nodes to store information defining the path. Whenever node 30A receives data bound for node 30L, node 30A may output the data via the physical link to node 30C.

During operation of network system 5, various ones of nodes 30 (and/or sub-network controllers 20, controller 10) may encounter situations unfavorable to the network, such as an outage, overload, or other issue. During such situations, a node may determine that alarm conditions of the node have been satisfied. Alarm conditions may correspond to any number of situations that a network device may encounter, such as failure of a physical link, overloading of the device, or other situation. As one example, during operation, node 30A may determine that node 30A has ceased receiving Hello packets and/or acknowledgements from node 30C regarding data that node 30A sent via the shared physical link. For example, node 30A may send a number of packets (e.g., 10, 100, 1000, or other number) to node 30C, but may receive no acknowledgement that the packets were received by node 30C. In such instance, node 30A may determine that an alarm condition has been satisfied (e.g., no acknowledgements received for sent data for a threshold period of time, no acknowledgements received for a threshold number of sent data packets, or other conditions).

In response to detecting a satisfied alarm condition, a network device may output status information including an indication of the satisfied alarm condition (e.g., a message that indicates an "alarm"). In the example of FIG. 1, for instance, responsive to determining that the alarm condition has been satisfied, node 30A may generate and output one or more messages specifying status information including an alarm. The alarm may inform other devices of the problem encountered (e.g., link failure). In some examples, the status information may include information about the alarm, such as when the alarm was encountered, information identifying the device and device components implicated by the alarm, or other details.

Network devices may have different conditions for raising alarms or may handle the gathering of information for alarm conditions in different manners. For instance, while node 30A may raise an alarm after failing to receive acknowledgements for a particular time period (e.g., 10 seconds), another of nodes 30 may raise an alarm after failing to receive such acknowledgements after sending a particular number of packets (e.g., 100). Such alarms, if not qualified, may lead to incorrect interpretation (e.g., by other devices, by network management devices, and/or by network administrators). For instance, nodes that are far away from the source of error conditions could raise alarms prior to nodes more local to the error. Such a scenario may make it difficult for devices or administrators to assess the situation and may result in a device or administrator incorrectly or inefficiently handling network issues.

In order to improve the reporting and handling of such network alarms, one or more of the devices in a network may be configured to perform operations to determine a confidence level associated with an alarm, and may include information indicating the confidence level in network alarm messages, in accordance with the techniques described in the present disclosure. In the example of FIG. 1, controller 10 includes alarm management module 12 and each of sub-network controllers 20 includes a respective one of alarm management modules 22A-22N (collectively, "alarm management modules 22"). Node 30A includes alarm management module 32.

When node 30A determines that one or more predefined alarm conditions have been met (e.g., when node 30A encounters a problem), alarm management module 32 may determine a confidence level associated with the alarm. For instance, if node 30A initially detects an alarm condition that indicates that the physical link 26 to node 30C is "down" (i.e., inoperable or operating poorly), alarm management module 32 of node 30A may perform operations to verify that link 26 is not operating correctly and determine the extent to which link 26 is inoperable, such as attempting to send additional data via link 26, attempting to ascertain the status of node 30C reachable via link 26 or other operations. In some cases, the alarm condition may indicate that link 26 is congested (though still technically operable), e.g., by determining that an amount of network traffic received via the link 26 in some time period is below a threshold level. In some examples, an alarm management module may determine a confidence level associated with an alarm using alternative means to test the alarm conditions. That is, the alarm management module may be able to correlate information from various sources to determine a confidence level. For instance, in some examples alarm management module 32 may test the continued validity of an alarm by evaluating the same conditions that caused the alarm initially while in other examples alarm management module 32 may determine the confidence level of the alarm using other mechanisms.

In addition to performing operations to determine a confidence level for an alarm, a network device may output information indicative of the determined confidence level for the alarm, thereby providing other devices with more information about the encountered situation. For example, node 30A may output an alarm message 28 that specifies a confidence level associated with the alarm. In some examples, node 30A may output multiple alarm messages (not shown), e.g., to all neighboring devices. In other examples, node 30A may output alarm message(s) only to network and/or sub-network controllers with which node 30A communicates. For instance, when the alarm is initially raised by node 30A, alarm management module 32 may cause node 30A to output an alarm message 28 that includes a confidence level indicating that the alarm has been raised, but has not yet been tested (e.g., a "Triggered" confidence level). Upon initiating the operations to test the validity of the alarm (e.g., determine the extent to which the link is operational), alarm management module 32 may cause node 30A to output an updated alarm message that specifies a different confidence level indicating that the alarm is currently undergoing testing (e.g., a "Testing" confidence level). If alarm management module 32 determines, based on the performed operations, that test results were consistent with the initial alarm, thus indicating that the alarm was correctly raised (e.g., the operations also failed to send any additional data via the link), alarm management module 32 may cause node 30A to output another alarm message that includes a confidence level indicating such confirmation of the alarm (e.g., a "Tested" confidence level).

If alarm management module 32 determines that the alarm is no longer active (e.g., the alarm conditions are no longer satisfied), alarm management module 32 may cause node 30A to output another alarm message that includes a confidence level indicating an all clear or false alarm (e.g., a "Cleared" confidence level). If alarm management module 32 uses an alternative means to test the validity of the alarm, the alternative means may provide results that are inconsistent with the separate state of ongoing satisfied alarm conditions. In such instance, alarm management module 32 may cause node 30A to output an alarm message that includes a confidence level indicating this inconsistency (e.g., an "Inconsistent" confidence level). If alarm management module 32 is unable to determine whether the alarm condition continues or not, or otherwise cannot assess the validity of the alarm, alarm management module 32 may cause node 30A to output an alarm message that includes a confidence level indicating that the alarm has become stale, as the certainty of the alarm cannot be determined or verified (e.g., an "Unknown" confidence level).

Systems and devices configured in accordance with the techniques described herein may perform various operations in response to receiving alarm messages, based on a corresponding confidence level of the alarm. In some examples, all devices in a network or sub-network may be configured to use a common confidence level framework as described herein, in which the different alarm confidence levels are standard and have a common significance or meaning across different network devices. In other examples, only a subset of network devices may be configured to recognize and/or act in accordance with commonly understood, normalized confidence levels. In the example of FIG. 1, sub-network controller 20A may be configured to receive information indicative of confidence levels for alarms and act based at least in part on those confidence levels. For instance, sub-network controller 20A may receive the alarm messages output by node 30A corresponding to the failure of node 30A's link to node 30C and perform operations depending on the indicated confidence level of the alarm.

Sub-network controller 20A may initially receive an alarm message that includes a confidence level of "Triggered" (indicating that the alarm has been triggered, but has not yet been tested). Responsive to receiving an alarm message indicating a failed link and the alarm having a "Triggered" confidence level, sub-network controller 20A (e.g., alarm management module 22A) may cause one or more components of sub-network controller 20A to perform re-optimization of paths through sub-network 24A in order to avoid the allegedly failed link. However, alarm management module 22A may require an alarm message indicating a confidence level of "tested," "inconsistent," or "unknown" before sub-network controller 20A can push re-optimized routing information to nodes in sub-network 24A. By waiting until an alarm has been tested and confirmed or at least not cleared, alarm management module 22A may prevent sub-network controller 20A from performing computationally expensive or disruptive procedures that may be unnecessary. This may improve operational efficiency of sub-network controller 20A, and allow sub-network controller 20A to direct computational resources to alarms that have been verified, such as in a prioritized manner.

By determining a confidence level for the alarm and outputting information indicative of that confidence level, alarm management modules 32 may allow other devices (e.g., others of nodes 30, and/or one or more of sub-network controllers 20, controller 10) and/or network administrators to more intelligently and/or efficiently respond to the alarm. For instance, devices configured in accordance with the techniques described herein may wait until receiving an indication of certain confidence levels before performing operations to fix an alleged problem, thereby avoiding costly and potentially unnecessary complications. For example, in accordance with the techniques described herein, sub-network controller 20A may, as one example, abandon the re-optimization process if sub-network controller 20A receives information indicating that the alarm is associated with a "Cleared" confidence level. Sub-network controller 20A may thereby operate in a more efficient manner. As another example, by filtering alarms based on the associated confidence level, a network administrator or device may be able to obtain more reliable alarm information from the network. Moreover controller 10 and/or one or more of sub-network controllers 20 may be able to apply filters and algorithms to perform a faster analysis of any potential network issues and/or respond to such issues, since the associated confidence level of an alarm can be used to determine the state of the network even with patchy information, e.g., during a catastrophic scenario in which a high volume of alarms are raised in a time period.

In the example of FIG. 1, alarm management module 12 and alarm management modules 22 may include functionality similar to that described with respect to alarm management module 32. That is, alarm management modules 12 and 22 may enable controller 10 and/or sub-network controllers 20 to determine a confidence level associated with an alarm indicated in a received alarm message (e.g., an alarm raised by one of nodes 30 or other device) and to output information indicative of the determined confidence level. That is, in some examples, controller 10 and/or sub-network controllers 20 may receive, from a managed network device, an alarm message that does not include any confidence information. Responsive to receiving the alarm message, controller 10 and/or sub-network controllers 20 may determine a confidence level to associate with the specified alarm. In some examples, alarm management modules 12 and 22 may determine the confidence level by communicating with the node or device that raised the alarm. In some examples, alarm management modules 12 and 22 may be able to determine the status of the situation independently (e.g., through other means). In any case, alarm management modules 12 and 22, as well as alarm management module 32, may enable devices of network system 5 to determine a confidence level associated with an alarm and output the confidence level (e.g., sub-network controllers 20 sending messages, which specify the confidence level, to network controller 10) for use in managing network system 5.

While described herein in the context of communications networks, the techniques of the present disclosure may apply to various types of computing networks. For example, the techniques described herein may be useful in utilities networks (e.g., power grids), automated manufacturing, automotive networks (e.g., networks for intra-vehicle or inter-vehicle monitoring), or any other network in which a device may receive and use information about another device.

Figure 2:
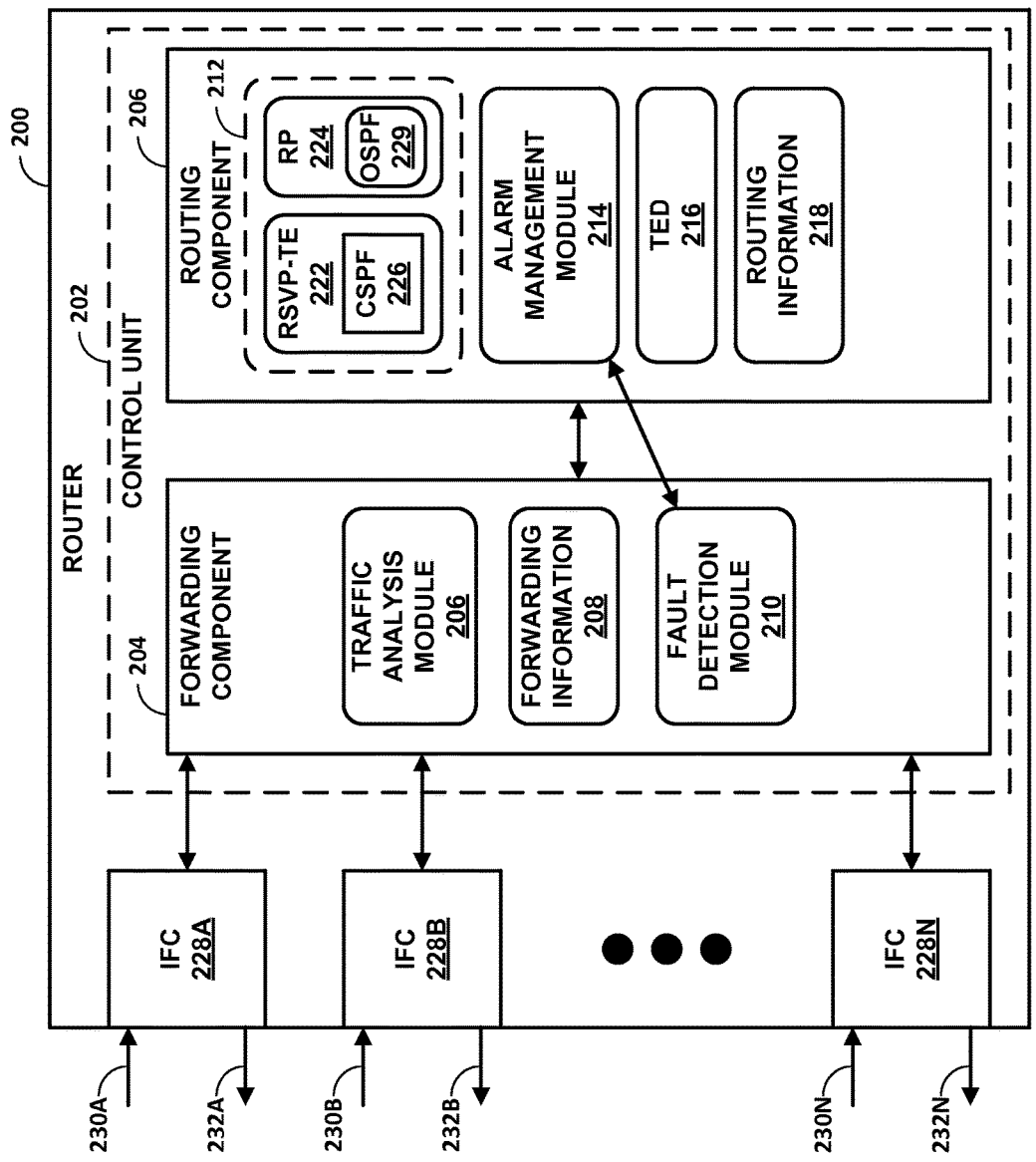
FIG. 2 is a block diagram illustrating an example network device configured to use confidence level information for network alarms in accordance with one or more of the techniques described herein.

FIG. 2 is a block diagram illustrating an example network device 200 (hereinafter, "router 200") configured to use confidence level information for network alarms in accordance with one or more of the techniques described herein. Router 200 may represent one or more nodes in a managed or unmanaged network. For instance, router 200 may represent one example of node 30A in FIG. 1.

In the example of FIG. 2, router 200 includes a control unit 202 that comprises a forwarding component 204 and a routing component 206. In addition, router 200 includes a set of interface cards (IFCs) 228A-228N (collectively, "IFCs 228") for communicating packets via inbound links 230A-230N (collectively, "inbound links 230") and outbound links 232A-232N (collectively, "outbound links 232").

Routing component 206 primarily provides an operating environment for control plane protocols, such as those included in protocols 212. Protocols 212 include one or more routing protocols ("RP") 224 that may maintain routing information 218 that reflects the current topology of the network and other network entities to which router 200 is connected. Example routing protocols include the Open Shortest Path First (OSPF) routing protocol (shown in FIG. 2 as OSPF module 229), the Border Gateway Protocol (BGP), the Intermediate System to Intermediate System (IS-IS) routing protocol, and the like. Protocols 212 also include one or more MPLS protocols for router-to-router communications, such as the Label Distribution Protocol (LDP), and/or the Resource Reservation Protocol with Traffic Engineering extensions (RSVP-TE) 222. RSVP-TE 222 may generate and maintain traffic engineering database (TED) 216, including bandwidth reservations for certain paths associated with the network. In some examples, RSVP-TE 222 may use a Constrained Shortest Path First (CSPF) process 226 to compute a shortest path or paths for a communication session based on specified constraints and bandwidth availability information associated with the links within the network. For instance, RSVP-TE 222 may compute and establish Label Switched Paths (LSPs) within the network. In some examples, RP 224 may advertise calculated bandwidth availability information in TED 216 to other peer routers.

Routing component 206 may generate forwarding information based on routing information 218, and program forwarding component 204 with forwarding information 208 that associates network destinations with specific next hops and corresponding interface ports of IFCs 228 in accordance with routing information 218. For instance, routing component 206 may generate forwarding information 208 in the form of a radix tree having leaf nodes that represent destinations within the network. Based on forwarding information 218, forwarding component 204 forwards packets received from inbound links 230 to outbound links 232 that correspond to next hops associated with destinations of the packets. In some examples, forwarding component 204 may be a rich and dynamic shared forwarding plane, optionally distributed over a multi-chassis router. Forwarding component 204 may be provided by dedicated forwarding integrated circuits normally associated with high-end routing components of a network router.

In the example of FIG. 2, forwarding component 204 may include fault detection module 210. Fault detection module 210 may represent physical or logical components of router 200 that are configured to monitor the operation of forwarding component 204. For instance, fault detection module 210 may monitor various aspects of traffic flow through router 200, such as the amount of incoming and outgoing traffic through one or more of IFCs 228, the overall amount of traffic being handled by forwarding component 204, and other metrics. As one example, fault detection module 210 may comprise a Bidirectional Forwarding Detection (BFD) module that operates in accordance with the BFD network protocol.

One or more components of router 200, such as fault detection module 210, RSVP-TE 222, RP 224, OSPF 229, or others, may be configured to raise an alarm in response to detecting the presence of a network alarm condition. In various examples, alarm conditions may be pre-configured (e.g., based on predefined alarm threshold(s)), may be specified or defined by an administrator of router 200, and/or may be defined in any other way. That is, router 200 may be configurable to monitor for various fault conditions that may arise during the operation of a network device, including complex or catastrophic faults. For instance, fault detection module 210 may raise an alarm when forwarding component 204 is saturated with traffic, or when incoming traffic for a particular IFC changes more than a specified percentage. As another example, RSVP-TE 222 or RP 224 may raise an alarm when certain messages are received from other network devices or when connections are determined to have failed or changed. When raising an alarm, the components of router 200 may, in some examples, transmit an indication of the alarm to alarm management module 214. Alarm management module 214 may handle the raised alarm by outputting one or more alarm messages (e.g., to other network devices). In accordance with the techniques described herein, alarm management module 214 may also determine a confidence level for the alarm, and output an indication of the confidence level to the other network devices.

In one example of operation, alarm management module 214 may output alarm messages that include confidence level indications. The alarm messages that specify confidence level indications may be helpful to a network controller, for example, in assessing a situation in which an OSPF neighbor of router 200 is detected as being down but a RSVP-TE LSP that includes the neighbor is still seen by the network controller as being "up." For example, router 200 may function as part of one or more LSPs. During operation, OSPF module 229 determines that an interface coupled to an upstream router is down (e.g., traffic is no longer being received on the interface). OSPF module 229 may, for example, determine this based on a lack of Hello messages, Link State Update messages and/or Link State Acknowledgement messages being received on that interface from the upstream router. OSPF module 229 may update routing information 218 to reflect that the interface is removed from the OSPF network topology. However, depending on the configuration of router 200, in some situations OSPF module 229 detecting that the interface is down will not automatically trigger a fast reroute operation by RSVP-TE module 222 to redirect traffic, which had been flowing on an RSVP-TE LSP along a path that includes the upstream router, to a bypass LSP that avoids the down link between router 200 and the upstream router. In this situation, from the perspective of RSVP-TE module 222, it may appear that traffic is still flowing along the primary LSP through the upstream router, which is inconsistent with the alarm raised by OSPF module 229.

When OSPF module 229 initially detects that the interface is down, OSPF module 229 may send an indication of the alarm to alarm management module 214. In accordance with the techniques of the present disclosure, alarm management module 214 may determine a confidence level for the alarm in response to receiving the indication of the alarm. The confidence level may, in some examples, be expressed as one of a set of confidence indicators or states (e.g., Triggered, Testing, Tested, Inconsistent, Cleared, Unknown, or other indicator). Upon receiving the indication of the alarm from OSPF module 229, for instance, alarm management module 214 may determine an initial confidence level of Triggered, indicating that the alarm has been raised, but no testing of the alarm has yet taken place.

In response to receiving an alarm indication, alarm management module 214 may generate an alarm message to inform other network devices, including, for example, one of sub-network controllers 20 (FIG. 1), of the alarm condition. For instance, in response to receiving some indication of the alarm condition from OSPF module 229, alarm management module 214 may generate an alarm message that specifies the alarm (e.g., an alarm type and specific details about the alarm, such as the interface of router 200 that is connected to the allegedly down neighbor). The alarm message may also indicate the determined confidence level associated with the alarm. Sending out an initial alarm message with a Triggered confidence level may, for instance, allow a controller (e.g., one of sub-network controllers 20 or controller 10 of FIG. 1) to be informed of the possible issue and take preliminary or precautionary actions. As one example, a controller that receives an alarm message indicating that OSPF detected a link was down and that the condition has been verified by testing (e.g., an alarm associated with a "Tested" confidence level) may send a message to network device 200 causing RSVP-TE to reroute network traffic to a bypass LSP, or take other action. As another example, the controller may send a message to network device 200 configuring settings of network device 200 to enable BFD triggered local repair functionality on network device 200. If the controller has only received the alarm with a "triggered" confidence level, the controller may take no action until receiving an alarm with an updated confidence level.

In accordance with the techniques described herein, alarm management module 214 may perform operations to assess the continued validity of the alarm, or confirm the existence of the satisfied alarm conditions. For instance, after sending out the alarm message indicating the OSPF neighbor's alleged failure, alarm management module 214 may obtain other information, such as usage statistics from RSVP-TE 222 to determine whether the neighboring device is actually down. In some examples, upon initiation of such operations, alarm management module 214 may determine a new confidence level for the alarm, such as a Testing confidence level that indicates the alarm has been raised, and is currently undergoing testing. Alarm management module 214 may send out another alarm message indicating the Testing status of the alarm.

Once the testing is completed, alarm management module 214 may output another alarm message indicating a confidence level determined based on the results of the testing. For instance, if the testing results indicate that the alarm conditions are no longer satisfied and the neighboring device has returned to functioning properly, alarm management module 214 may determine a Cleared confidence level, indicating that the alarm was raised, but has been cleared. As another example, alarm management module 214 may determine a confidence level of "Inconsistent" if the testing results conflict with the satisfied alarm condition. For instance if the usage statistics obtained from RSVP-TE 222 indicate that the LSP is still up, the satisfied alarm condition may be incorrect, or the LSP usage statistics may be incorrect. A controller receiving an alarm message in which such an alarm is associated with an "Inconsistent" status may avoid performing costly re-routing procedures and instead may perform further diagnostics to determine the status of the network device. In some examples, the results of testing may be consistent with the initial alarm message. In such instance, alarm management module may output an alarm message with a confidence level of "Tested," indicating that the alarm has been raised and has been verified. In some examples, if alarm management module 214 is unable to test the alarm conditions, and/or if, after testing of the alarm conditions, the alarm continues for a specified period of time, alarm management module may output an alarm message with a confidence level of "Unknown," indicating that the validity of the alarm is not known.

Alarm management module 214 may generate and output alarm messages in accordance with various standard protocols. For instance, each message may be binary data including one or more bits representing a type of alarm, one or more bits representing a device ID of the device that generated the alarm, one or more bits representing a component ID (e.g., identifying an interface card, link, port, switch fabric port, network protocol, or other component) which is implicated by the alarm, one or more bits representing a time at which the alarm was first raised, and/or other information.

As described herein, alarm messages may also include information indicative of a confidence level for the alarm. Confidence level information may be included in alarm messages in any way that does not impede the receipt and proper interpretation of the alarm messages by other devices. In some examples, for instance, alarm management module 214 may generate alarm messages having a different value for a particular confidence level variable, such as values representing "Triggered," "Testing," and other confidence level indicators. In some examples, alarm management module 214 may generate messages having a binary variable for each confidence level indicator. For instance, an alarm message may have a number of confidence level bits, with each bit indicating a different confidence level. In some examples, the various confidence levels may be mutually exclusive (e.g., only one confidence level is allowed at a time) while in other examples, the confidence levels may not be exclusive (e.g., an alarm message may indicate both a "Triggered," a "Testing," and a "Tested" confidence level). Alarm management module 214, in various examples, may periodically generate alarm messages or may generate alarm messages only when the corresponding confidence level has changed.

In a further example, when RSVP link protection is being run on interfaces of router 200, and a link-protected interface goes down, a previously hidden route for the RSVP bypass LSP (previously established by RSVP-TE module 222) may become "active" in a routing table of routing information 218. When the down interface subsequently comes back up, however, in some cases the RSVP bypass LSP does not go away in the routing table. Alarm management module 214 may detect an alarm condition when the original interface comes back up, and may output an alarm message indicating that the original interface is back up, with a Triggered confidence level. Alarm management module 214 may then initiate testing to verify that traffic is passing on the original interface, and may output a second alarm message for the same alarm, with a Testing confidence level. Alarm management module 214 may determine that no traffic is passing over the original interface, which may be because the RSVP bypass LSP route is still present in the routing table and traffic is still being rerouted onto the bypass LSP to bypass the interface/protected link. Alarm management module 214 may then output a third alarm message for the same alarm, with an Inconsistent confidence level. In some examples, a controller receiving the third alarm message with the Inconsistent confidence level may, in response, output a message that will configure the route table of routing information 218 to make the RSVP bypass LSP hidden again such that traffic will pass over the original link/interface that is now up. Alternatively, the controller may take some other action to address the inconsistency at router 200. In some examples, the controller may, in response to receiving the third alarm message with the Inconsistent confidence level may configure router 200 to address the issue by enabling only fast reroute or link protection, but not both.

In another example of operation, alarm management module 214 may determine and output confidence level information for an alarm indicating packet loss on an interface. For instance, fault detection module 210 may maintain counters that monitor the amount of traffic on one or more of inbound links 230 and/or outbound links 232. The counters may measure packet loss for the link in a specified time interval (e.g., 10 milliseconds or other interval) based on Ethernet Operations, Administration, and Management (OAM) sampling. If the packet loss in a particular time interval is above a specified threshold value, fault detection module 210 may determine that an alarm condition is satisfied, and may send an indication of an alarm to alarm management module 214.

Alarm management module 214 may receive the indication and determine a Triggered confidence level for the alarm. For example, when alarm management module 214 determines (e.g., based on characteristics of the alarm) that the alarm is a new alarm condition that is being raised, alarm management module 214 may assign an initial confidence level of "Triggered." Alarm management module 214 may generate an alarm message that specifies information about the alarm and information indicative of the confidence level, and output the alarm message to one or more other devices in the network, such as a controller (e.g., one of sub-network controllers 20 of FIG. 1). Upon receiving the alarm message from router 200, the controller may, in some examples, log the alarm, but based on the confidence level being "Triggered" may take no further action, as the alarm has not yet been tested.

Alarm management module 214 may perform one or more operations to test the validity of the received alarm. For instance, alarm management module 214 may communicate with traffic analysis module 206 to obtain traffic sampling statistics for the link implicated by the alarm. The sampling statistics may be aggregated link statistics that are measured over a longer period of time, T, such as a period of 5 seconds, 10 seconds, or other time period. Thus, testing of the alarm may take a substantial amount of time relative to the conditions that caused the alarm. Upon initiating testing, alarm management module 214 may output another alarm message that specifies a "Testing" confidence level, indicating that the alarm has been raised and is also currently undergoing testing. In some examples, alarm management module 214 may use an "Aggregating" confidence level, indicating that the testing phase is based on aggregation of statistics.

Upon completion of the testing, alarm management module 214 may output an alarm message that specifies a confidence level determined based on the aggregated statics. For instance, if the aggregate statistics for the time period T indicate that traffic on the link was substantially smaller compared to the previous time period, alarm management module 214 may determine a "Tested" confidence level for the alarm. Alarm management module 214 may determine that an amount of traffic on a link is substantially smaller if, for instance, the traffic is different from the previous amount of traffic by a specific threshold percentage, or by a specific threshold value. If the aggregate statistics for the time period T indicate little to no difference in traffic, then alarm management module 214 may, in some examples, determine a confidence level of "Inconsistent." In other examples, alarm management module may determine a confidence level of "Cleared." Regardless, alarm management module 214 may output another alarm message that includes the updated confidence level determined after testing.

In another example of operation, alarm management module 214 may determine a confidence level for a switch fabric failure alarm. Router 200 may include a switch fabric (not shown) that is coupled to IFCs 228 and forwarding component 204. For example, the switch fabric may include one or more switch fabric chips on one or more separate, removable switch cards. Router 200 may also include a switch fabric management module (not shown) that can determine when a problem has occurred in the switch fabric of router 200 (e.g., within forwarding component 204). For example, in some cases the switch fabric may be one-to-one protected by having a primary switch fabric and a secondary (backup) switch fabric. When a problem occurs with the primary switch fabric, the switch fabric management module may move the traffic flowing over the switch fabric within router 200 off the primary switch fabric and onto the secondary switch fabric, and may raise an alarm condition, sending an indication of the alarm to alarm management module 214. In response to receiving the alarm condition from the switch fabric management module, alarm management module 214 may determine a confidence level of "Triggered," and output an alarm message (e.g., to a controller) indicating the alarm and the Triggered confidence level.

Alarm management module 214 may cause one or more components of router 200 to perform operations to test the switch fabric, such as requesting the switch fabric management module to check whether all traffic has been removed from a primary switch fabric and is only flowing on a secondary switch fabric. As another example, alarm management module 214 may communicate with each forwarding module of router 200 to determine whether any forwarding modules receive packets from the primary switch fabric. If any modules do receive packets, then alarm management module 214 may determine that not all modules executed the change to the secondary or redundant switch fabric, and some are still sending packets into the failed fabric. Thus, a subsequent failure of the primary switch fabric may affect traffic. Upon initiating testing, alarm management module 214 may determine a "Testing" confidence level for the alarm, and output another alarm message indicating the "Testing" confidence level.

Based on the results of the testing, alarm management module 214 may determine an updated confidence level for the alarm (e.g., a "Tested" confidence level, an "Inconsistent" confidence level (e.g., maybe some traffic is still flowing on the primary switch fabric so the whole of primary switch fabric is not down), a "Cleared" confidence level, or other confidence level) and output another alarm message indicating the updated confidence level.

As another example of operation, alarm management module 214 may determine and output confidence level information for an alarm indicating a high temperature (e.g., in an installed interface card). For instance, a temperature sensor (not shown) of one of IFCs 228 (e.g., IFC 228B) may determine that a monitored temperature has exceeded a specified threshold, thereby satisfying an alarm condition. The temperature sensor of IFC 228B may send an indication of a high temperature alarm to alarm management module 214.

Alarm management module 214 may receive the high temperature alarm and determine a Triggered confidence level for the alarm. Alarm management module 214 may generate and output an alarm message that specifies the high temperature alarm, information indicative of the confidence level (e.g., Triggered), and other information about the alarm, such as where the alarm is located (e.g., IFC 228B).

A controller or sub-network controller (e.g., one of sub-network controllers 20) may receive the alarm message and log the high temperature alarm, but may not take any other action based on the confidence level associated with the alarm.

In accordance with the techniques described herein, alarm management module 214 may perform one or more operations to test the validity of the received high temperature alarm. For instance, alarm management module 214 may poll one or more temperature sensors of other components located near the alarmed temperature sensor, such as a temperature sensor of IFC 228A (not shown). That is, because of temperature dissipation, if IFC 228B is experiencing a high temperature, it is likely that nearby components will also be experiencing elevated temperatures, and thus testing the temperature of one or more of those nearby components may help determine whether the initial high temperature alarm is valid. For example, in various networking equipment, two slots are stacked one upon the other. Since heat dissipates to the top, the higher slot should be hotter than the lower one. If a lower sensor detects a high temperature, but an upper sensor is still in a normal temperature zone, the lower sensor may be damaged.

As another example, alarm management module 214 may communicate with IFC 228B to obtain other information that may corroborate the high temperature alarm, such as a measure of the current running through IFC 228B. That is, if the temperature sensor of IFC 228B is truly experiencing a high temperature, then it may be likely that the IFC is pulling a high current and/or that an adjacent card is also experiencing an elevated temperature. Alarm management module 214 may check the temperature and current of the upper slots in parallel, for example. Upon initiating testing, alarm management module 214 may output another alarm message that specifies a "Testing" confidence level.

Upon completion of the testing, alarm management module 214 may determine an updated confidence level based on the results of the testing. For instance, if the temperature sensor of IFC 228A indicates an abnormally high temperature and/or if IFC 228B has an abnormally large current running through it, then alarm management module 214 may determine a "Tested" confidence level for the high temperature alarm. If the temperature sensor of IFC 228A indicates a normal temperature and/or if IFC 228B has an acceptable level of current usage, then alarm management module 214 may determine an "Inconsistent" confidence level. In some examples, such as if alarm management module 214 determines that all other means of testing the alarm indicate that the temperature sensor of IFC 228B is incorrect, alarm management module 214 may determine a confidence level of "Cleared," indicating that it is very likely that the alarm was raised erroneously. That is, if there is no discrepancy with historical data and other tests determine that everything is functioning as normal, there is a high probability that the high temperature alarm of the lower slot is incorrect. Alarm management module 214 may output another alarm message that includes the updated confidence level determined after testing. A controller or sub-network controller that receives the alarm message indicating a "Tested" confidence level may take one or more actions to reduce or stop router 200's usage of IFC 228B, or otherwise address the problem. If the controller or sub-network controller receives an alarm message indicating a "Cleared" confidence level, the controller may log the alarm and updated confidence level, but do nothing more. If the controller or sub-network controller receives an alarm message indicating an "Inconsistent"

confidence level, the controller may perform actions or may not (e.g., depending on the controller's configuration).

In some examples, alarm management module 214 may not have to perform testing of an alarm. For instance, when a protocol element such as one of RP 224 encounters certain errors that do not affect forwarding, it may satisfy an alarm condition. This is because a controller or administrator may still find this information important, but it may not affect the overall state of the device or of the network. In such example, alarm management module 214 may output an alarm message with a "Triggered" confidence level to indicate the event has happened. However, because the event does not really reflect the forwarding state of the device, alarm management module 214 may not perform testing or update the confidence level. In this way, a controller or administrator can use confidence levels for alarms to filter the alarms. That is, by determining confidence levels for alarms, the techniques described herein may allow other devices and users to more easily focus on the important alarms and identify important issues by filtering out various statuses.

Figure 3:
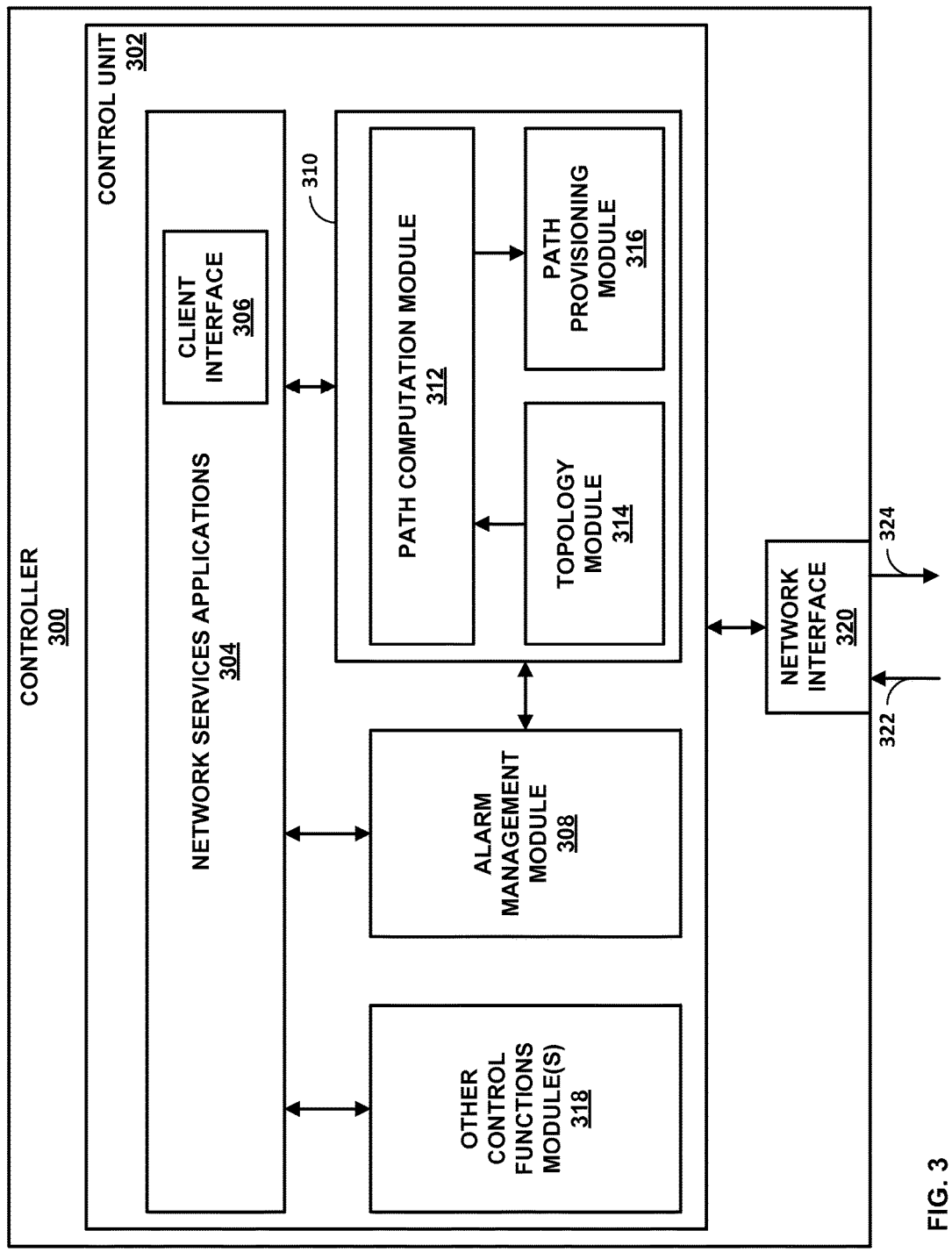
FIG. 3 is a block diagram illustrating an example controller configured for managing networks using confidence level information for network alarms in accordance with one or more of the techniques described herein.

FIG. 3 is a block diagram illustrating an example controller 300 configured for managing networks using confidence level information for network alarms in accordance with one or more of the techniques described herein. Controller 300 may represent a server, a network controller, a sub-network controller, or other network management unit. For instance, controller 300 may represent an example instance of controller 10 and/or one or more of sub-network controllers 20 as shown in FIG. 1.

In the example of FIG. 3, controller 300 includes a control unit 302 coupled to a network interface 320 to exchange packets with other network devices by inbound link 322 and outbound link 324. Control unit 302 may include one or more processors (not shown in FIG. 3) that execute software instructions, such as those used to define a software or computer program, stored to a computer-readable storage medium (not shown in FIG. 3), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 302 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 302 provides an operating environment for network services applications 304, alarm management module 308, path computation module 312, topology module 314, path provisioning module 316, and other control function module(s) 318. In one example, these modules may be implemented as one or more processes executing on one or more virtual machines of one or more servers. That is, while generally illustrated and described as executing on a single controller 300, aspects of these modules may be delegated to other computing devices.

Network services applications 304, in the example of FIG. 3, represent one or more processes that provide services to clients of a network that includes and/or is managed by controller 300. Network services applications 304 may, for example, provide Voice-over-IP (VoIP) services, Video-on-Demand (VOD) services, bulk transport services, walled/open garden services, IP Mobility Subsystem (IMS) services or other mobility services, and/or Internet services to clients of the managed network. Each of network services applications 304 may include client interface 306 by which one or more client applications request services. Client interface 306 may represent a command line interface (CLI) or graphical user interface (GUI), for instance. Client 306 may also, or alternatively, provide an application programming interface (API) such as a web service to client applications.

In some examples, network services applications 304 may require support, such as node management, session management, policy enforcement, and/or other support. Path computation element 310, which includes modules 312, 314, and 316, may provide at least some such functionality. That is, in general, path computation element 310 may enable controller 300 to create, modify, and/or maintain the structure of the managed network. For instance, path computation element 310 may provide paths for network services applications 304. Network services applications 304 may issue path requests to path computation element 310 to request paths in a path computation domain controlled by controller 300. In general, an example path request may include a required bandwidth or other constraint and two endpoints representing network devices that communicate over the path computation domain managed by controller 300. Path requests may further specify time/date during which paths must be operational and CoS parameters (e.g., bandwidth required per class for certain paths).

Path computation element 310 can accept path requests from network services applications 304 to establish paths between the endpoints over the path computation domain. Paths may be requested for different times and dates and with disparate bandwidth requirements. In some examples, path computation element 310 may reconcile path requests from network services applications 304 to multiplex requested paths onto the path computation domain based on requested path parameters and anticipated network resource availability.

To intelligently compute and establish paths through the path computation domain, path computation element 310 includes topology module 314, which may receive topology information that describes available resources of the path computation domain, including network devices, interfaces thereof, and interconnecting communication links. In other words, topology module 314 may provide an interface by which controller 300 obtains topology information about the managed network.

In some examples, topology module 314 may receive topology information from network devices in the network. For instance, in one example in which controller 300 represents sub-network controller 20A of FIG. 1, topology module 314 may obtain topology information from one or more of nodes 26. In other examples, topology module 314 may receive the topology information from a centralized topology database. In a further example, topology module 314 may execute an interior routing protocol to receive the topology information.

Based on the obtained topology information, path computation module (PCM) 312 may, in some examples, compute forwarding information for transport data channels. In one example implementation, PCM 312 handles topology computation for a network or sub-network and programs forwarding information into the network devices by way of path provisioning module 316. Like topology module 314, path provisioning module 316 may in some examples communicate with network devices via network interface 320 to configure data planes of devices in the managed network.

Upon computing paths, PCM 312 may schedule the paths for provisioning by path provisioning module 316. A computed path includes path information usable by path provisioning module 316 to establish the path in the network. Provisioning a path may require path validation prior to committing the path to provide for packet transport.

Alarm management module 308, in the example of FIG. 3, represents one or more processes that receive, generate, and/or process alarms and associated confidence level information. For instance, alarm management module 308 may receive an alarm message from one or more nodes in the managed network. In some examples, such as when nodes are configured to determine a confidence level for an alarm, alarm management module 308 may additionally receive information indicative of a confidence level for the alarm. For instance, the node may determine that an alarm condition of the node has been satisfied, and output an alarm message indicating an initial confidence level of "Triggered." Alarm management module 308 may receive the alarm message including the indicated confidence level. For example, controller 300 may receive an alarm message at network interface 320, and may pass alarm information and confidence level specified by the alarm message to alarm management module 308. In some examples, the node from which the alarm message was received may perform operations to determine the continued validity of the alarm. Consequently, alarm management module 208 may receive additional alarm messages related to the same alarm and indicating confidence levels for the alarm (e.g., "Testing," "Tested," "Inconsistent," "Cleared," "Unknown," or another confidence level).

In some examples, the alarm messages may include an alarm identifier that uniquely identifies the alarm such that alarm management module 308 of controller 300 can track multiple alarm messages received over time and know that they are related to the same network alarm event. In some examples, alarm management module 308 determines that multiple alarm messages received over time are related to the same network alarm event based on various items of information specified by the alarm message, such as a sending device identifier, alarm type, identifier of network component implicated by the alarm (e.g., a link, switch fabric port, neighbor device, or other component), network protocol affected, and/or based on the times the multiple alarm messages were received.

In some examples, such as when a node is not configured to determine a confidence level (e.g., the node does not include an instance of alarm management module 32 as shown in FIG. 1), alarm management module 308 may communicate with the node to determine a confidence level for the alarm. For instance, alarm management module 308 may receive an alarm message from a node that does not indicate any confidence level for the alarm. In response to receiving such an alarm message, alarm management module 308 may initially determine a "Triggered" confidence level for the alarm. In some examples, alarm management module 308 may send a message to the node requesting information that may be used to evaluate the continued validity of the alarm and/or instructing the node to perform operations to test the validity of the alarm. For instance, if the alarm indicates a failed link based on the node's failure to receive packet acknowledgments, alarm management module 308 may request information regarding whether or not the node has continued to receive periodic status messages from the neighboring device. As another example, alarm management module 308 may send a message to one or more other devices coupled to the implicated link to check whether the other devices also indicate the link to be down. After sending the request for further information, alarm management module 308 may determine a confidence level of "Testing" for the alarm. Upon receiving the requested information and determining whether the alarm continues to be valid, alarm management module 308 may determine another confidence level for the alarm, such as "Tested," "Inconsistent," "Cleared," "Unknown," or other confidence level. In some examples, alarm management module 308 can maintain a data structure (not shown) storing received alarms and associated confidence level status of the respective alarms.

In some examples, based on an alarm message and its confidence level (e.g., either determined by the alarmed node or by controller 300), alarm management module 308 may cause controller 300 to perform various operations to modify or update one or more controlled network devices. In some examples, such as when controller 300 represents one of sub-network controllers 20, alarm management module 308 may cause controller 300 to additionally or alternatively output alarm messages and associated confidence level information to higher level devices, such as to controller 10 of FIG. 1.

In one example of operation, a managed node may output an alarm message indicating that an OSPF neighbor of the node has been detected as being down. Alarm management module 308 of controller 300 may receive the alarm message. In some examples, the alarm message may include information indicative of a confidence level for the alarm, such as a "Triggered" confidence level. In some examples, the alarm message may not include information indicative of a confidence level, but alarm management module 308 may determine a confidence level of "Triggered" for the alarm. Responsive to receiving an alarm message indicating that an OSPF neighbor is down and having a "Triggered" confidence level, alarm management module 308 may, in some examples, record the alarm in an alarm log data structure of controller 300, but may perform no further actions. That is, because the alarm only has a confidence level of "Triggered," and has thus not undergone testing, alarm management module 308 may avoid initiating any computationally costly operations based on the alarm. In some examples, in addition to recording the alarm in the log, alarm management module 308 may cause one or more other components of controller 300 to perform operations. For instance, alarm management module 308 may cause path computation element 310 to re-compute paths in the managed network to avoid the node that the alarm indicated is down.

In some examples, the managed node may initiate testing of the alarm in accordance with the techniques described herein. Consequently, alarm management module 308 may receive another alarm message indicating a "Testing" confidence level for the alarm. In some examples, alarm management module 308 may send a message to the node instructing the node to initiate testing or provide additional information. For instance, the message may instruct the node to provide usage statistics for an LSP that includes the neighboring device. After sending the message to the node, alarm management module 308 may determine a confidence level of "Testing" for the alarm. Responsive to the alarm having a "Testing" status, alarm management module 308 may record the alarm with the updated confidence level in the log of controller 300 but perform no further actions. That is, alarm management module 308 may, in some examples, refrain from performing additional actions in reliance on the alarm when an alarm is updated to a confidence level of "Testing."

Once testing is completed, alarm management module 308 may, in some examples, receive another alarm message from the node with an updated confidence level based on the results of the testing. For instance, the alarm message may indicate a confidence level of "Tested," "Inconsistent," "Cleared," or other confidence level. In other examples, alarm management module 308 may not receive another alarm message, but may receive the requested additional information or testing results from the node. In such instance, alarm management module 308 may determine an updated confidence level for the alarm. In any case, alarm management module 308 may log the alarm and updated confidence level and may cause controller 300 to perform one or more operations based on the updated confidence level for the alarm. For example, responsive to a "Tested" confidence level, or an "Inconsistent" confidence level, alarm management module 308 may cause path computation element 310 to perform re-optimization of the managed network, and push re-optimized routing information to the various managed nodes. Responsive to a "Cleared" confidence level, alarm management module 308 may not cause controller 300 to do anything, or, if path computation element 310 previously initiated operations to re-optimize the network (e.g., in response to receiving an alarm associated with a "Triggered" or "Testing" confidence level), alarm management module 308 may cause path computation element 310 to abandon any previously initiated operations to re-optimize the network. In this way, alarm management module 308 may utilize the confidence level to more efficiently perform network management and oversight.

In another example of operation, alarm management module 308 of controller 300 may receive an alarm message from a node indicating packet loss on an interface of the node. The alarm message may be the result of the node determining that the number of packets lost on the interface exceeded a threshold. The alarm message may indicate or alarm management module 308 may determine a confidence level of "Triggered" for the alarm. Responsive to receiving an alarm message indicating packet loss on an interface that has a confidence level of "Triggered," alarm management module 308 may, in some examples, log the alarm and take no further action.

The node may initiate testing procedures, and the confidence level of the alarm may be updated to "Testing." For instance, alarm management module 308 may send a request to the node that sent the alarm message and determine an updated confidence level, or the node may initiate testing on its own in accordance with the techniques described herein and output another alarm message indicating the updated confidence level. Alarm management module 308 may, in some examples, record the alarm and updated confidence level in the log but take no further action until receiving an indication that testing has completed. Once testing of the alarm is completed, the node or alarm management module 308 may update the confidence level of the alarm to "Tested," "Cleared," "Inconsistent," "Unknown," or other confidence level. Thereafter, alarm management module 308 may cause controller 300 to take appropriate action based on the updated confidence level, such as re-routing traffic if the updated confidence level is "Tested," or ignoring the alarm if the updated confidence level is "Inconsistent."

In another example of operation of controller 300, alarm management module 308 may receive an alarm message indicating a switch fabric failure within a node. Such an alarm, when associated with a "Triggered," "Testing," or "Cleared" confidence level may, in some examples, cause alarm management module 308 to log the alarm but perform no further action. If the alarm is associated with a "Tested" or "Inconsistent" confidence level, alarm management module 308 may cause controller 300 to perform operations such as re-optimizing the network to avoid the flawed switch fabric, instruct the node to re-route traffic, alert an administrator of controller 300 or of the node, or other operations.

In another example of operation of controller 300, alarm management module 308 may receive an alarm message indicating a high temperature was encountered within an interface card of a node. When associated with a "Triggered," "Testing," or "Cleared" confidence level, such an alarm may, in some examples, cause alarm management module 308 to log the alarm but perform no further action. If the alarm is associated with a "Tested" or "Inconsistent" confidence level, alarm management module 308 may cause controller 300 to perform operations such as sending instructions to the node to decrease or cease usage of the interface card, re-optimizing the network to avoid the overheating interface card, alerting an administrator of controller 300 or of the node, or other operations.

In another example of operation, controller 300 may not receive or determine updated confidence levels for various alarms. That is, for some alarms, alarm management module 308 may log the alarm with an initial confidence level, but may not perform additional operations. For instance, responsive to receiving an alarm message indicating that a protocol element of a node encountered an error that does not affect forwarding capabilities of the node. Alarm management module 308 may log the alarm with a "Triggered" confidence level, but may not cause the node to perform testing or receive updated alarm messages.

By using confidence level information associated (e.g., by the node or by alarm management module 308) with alarms, alarm management module may enable controller 300 and/or administrators to filter alarms based on importance, thereby enabling more efficient operation. As one example, in the instance of catastrophic network events, confidence levels for alarms may enable controller 300 to more efficiently triage network problems. That is, by determining confidence levels, alarm management module 308 may enable controller 300 to filter alarms based on their confidence level, and address the alarms in a prioritized order (e.g., alarms associated with a "Tested" or "Inconsistent" confidence level first, and other alarms after all the alarms associated with a "Tested" or "Inconsistent" confidence level have been addressed).

Other control functions module 318 represents any of a variety of functionality by which controller 300 can perform one or more control functions on behalf of network nodes. These other control functions can include, for example, one or more of additional configuration of the nodes, additional status monitoring of the nodes, image download to the nodes, gathering traffic statistics about network traffic at one or more nodes, gathering information about local load conditions on the nodes, or other control functions.

Figure 4:
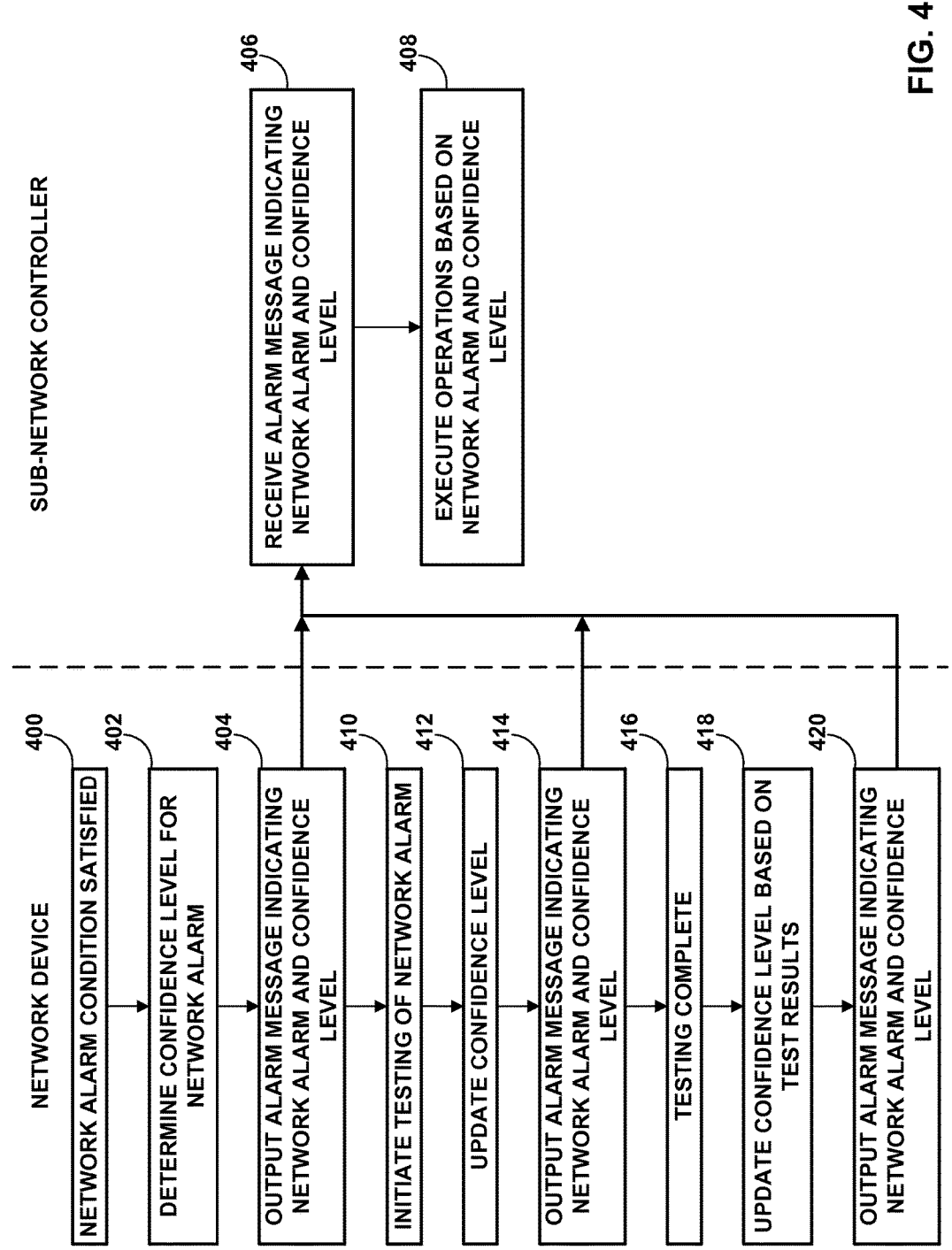
FIG. 4 is a flowchart illustrating example operations of an example network system having network devices configured to use confidence level information for network alarms in accordance with one or more of the techniques described herein.

FIG. 4 is a flowchart illustrating example operations of an example network system having network devices configured to use confidence level information for network alarms in accordance with one or more of the techniques described herein. For purposes of illustration only, the example operations of FIG. 4 are described below within the context of FIGS. 1, 2, and 3.

In the example of FIG. 4, a network device (e.g., node 30A) may determine that a network alarm condition of the network device has been satisfied (400). For instance, alarm management module 32 may receive an indication from one or more other components of node 30A that that node 30A has not received any Hello messages, Link State Update and/or Link State Acknowledgment messages from node 30C, that an interface of node 30A has dropped a threshold number of packets, that a protocol module of node 30C has encountered an error, or that some other network alarm condition has been satisfied. Responsive to receiving the indication of the satisfied network alarm condition, alarm management module 32 may determine a confidence level for the network alarm (402). For instance, alarm management module 32 may initially determine a confidence level of "Triggered," indicating that the network alarm has been triggered, but no testing has yet taken place.

Alarm management module 32 may cause node 30A to output an alarm message indicating the network alarm and associated confidence level (404). The alarm message may be sent to other network devices, such as one or more others of nodes 30, and/or to one or more of sub-network controllers 20 or controller 10. This may allow other devices in the network to respond to the network alarm in a more efficient manner by using the indicated confidence level to determine what operations to perform, and whether to wait for further confidence level updates before making network changes in reliance on the network alarm.

In the example of FIG. 4, a sub-network controller (e.g., sub-network controller 20A) may receive the alarm message indicating the network alarm and associated confidence level (406). Responsive to receiving the alarm message, sub-network controller 20A may execute one or more operations based on the network alarm and the associated confidence level (408). For instance, if the message indicates that an OSPF neighbor is down and the network alarm has a "Triggered" confidence level, sub-network controller 20A may store the alarm and confidence level to a data structure (e.g., a log file) and wait to perform any further actions.

Node 30A, in the example of FIG. 4, may initiate testing of the raised network alarm (410). In some examples, node 30A may test the alarm using the same mechanism (e.g., testing method) that raised the network alarm in the first place. For instance, if the satisfied network alarm condition constituted a loss of a threshold number of packets over a particular interface for a particular amount of time, node 30A may, in some examples, initiate testing of the network alarm by resetting the counter and counting the number of lost packets for the particular interface for the same duration of time. In some examples, node 30A may test the network alarm using a different mechanism (e.g., a different testing method). For instance, if the network alarm was raised based on a threshold number of packets being lost during a short time period (e.g., 10 ms or other time period), node 30A may initiate testing of the network alarm by aggregating statistics of the interface over a longer time period, such as 5 seconds, 10 seconds, or other duration.

Upon initiating testing, alarm management module 32 of node 30A may update the confidence level of the network alarm (412). For instance, because the network alarm is currently undergoing testing, alarm management module 32 may indicate a confidence level of "Testing." Alarm management module 32 may cause node 30A to output another alarm message indicating the network alarm and the updated confidence level (414). Sub-network controller 20A may receive the network alarm and updated confidence level and execute one or more operations based on the network alarm and confidence level. For instance, sub-network controller 20A may store the network alarm and updated confidence level to the log file and/or perform other operations.

In the example of FIG. 4, node 30A may complete testing of the network alarm (416). The results of the testing may, in various examples, indicate that the network alarm is valid, indicate that the network alarm condition is no longer satisfied, or indicate results that are inconsistent with the continued satisfaction of the network alarm condition. For instance, when the testing uses the same mechanism that triggered the original network alarm condition, the testing results may agree with the satisfied network alarm condition, or indicate that the network alarm condition is no longer satisfied. If the testing uses a different mechanism than the mechanism that triggered the original network alarm condition, the testing results may agree with the satisfied network alarm condition or be inconsistent with the satisfied network alarm condition.

Based on the test results, alarm management module 32 of node 30A may determine an updated confidence level for the network alarm (418). If the test results agree with the satisfied network alarm condition, alarm management module 32 may determine a "Tested" confidence level, indicating that the network alarm has been tested and is valid. If the test results indicate that the network alarm condition is no longer satisfied, alarm management module 32 may determine a "Cleared" confidence level, indicating that the network alarm has been tested and the network alarm condition is no longer satisfied. If the test results indicate that the network alarm condition is still satisfied, but the alternative means of testing the network alarm are inconsistent with the satisfied network alarm condition, alarm management module 32 may determine an "Inconsistent" confidence level.

Alarm management module 32 may cause node 30A to output another alarm message indicating the network alarm and the updated confidence level (420). Sub-network controller 20A may receive the alarm message indicating the network alarm and the updated confidence level and may execute operations based on the network alarm and the confidence level. For instance, if the network alarm is associated with a "Tested" confidence level or an "Inconsistent" confidence level, sub-network controller 20A may perform operations to cause node 30A and/or other managed nodes to avoid an interface that raised the network alarm, avoid a link that raised the network alarm, or otherwise work around the continuing problem. If, however, the network alarm is associated with a "Cleared" confidence level, sub-network controller 20A may execute other operations. For instance, if sub-network controller 20A previously initiated a re-routing procedure in response to receiving an alarm message in which the network alarm was associated with a "Triggered" or "Testing" confidence level, sub-network controller 20A may, in some examples, abandon the re-route procedure in response to receiving an alarm message indicating a "Cleared" confidence level.

Figure 5:
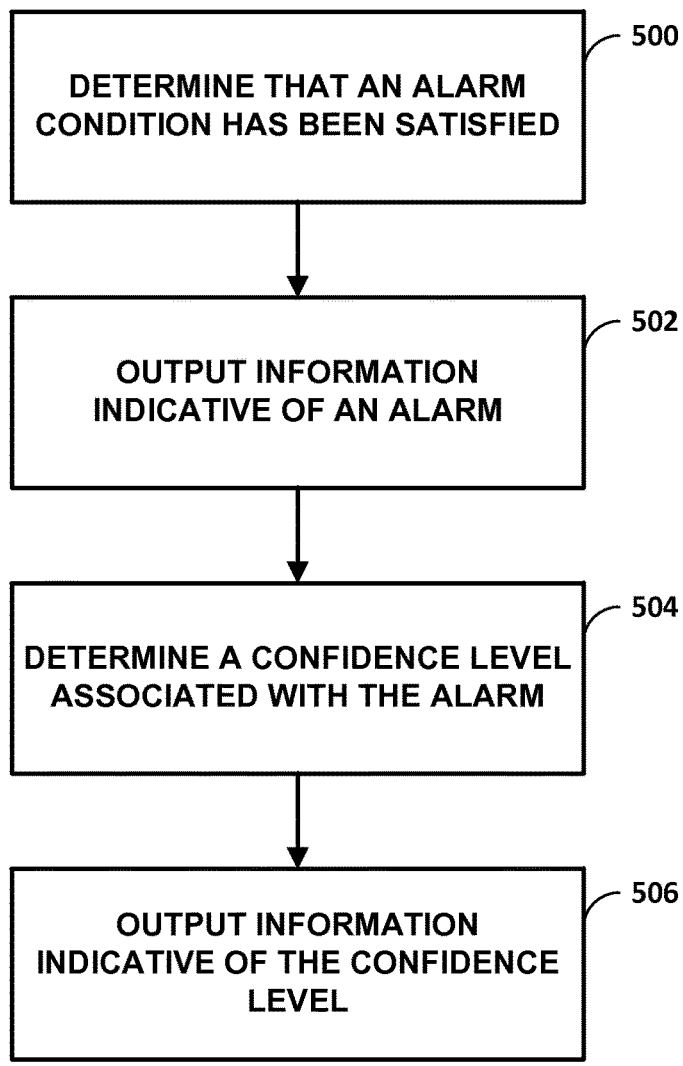
FIG. 5 is a flowchart illustrating example operations of an example network device configured to use using confidence level information for network alarms in accordance with one or more of the techniques described herein.

FIG. 5 is a flowchart illustrating example operations of an example network device configured to use confidence level information for network alarms in accordance with one or more of the techniques described herein. For purposes of illustration only, the example operations of FIG. 5 are described below within the context of FIGS. 1, 2, and 3.

In the example of FIG. 5, a network device (e.g., node 30A) may determine that a network alarm condition of the network device has been satisfied (500). Node 30A may output information indicative of a network alarm (e.g., an alarm message) based on the network alarm condition (502). Node 30A may also determine a confidence level associated with the network alarm (504). For instance, node 30A may determine a confidence level identifier of "Triggered," "Testing," "Tested," "Inconsistent," "Cleared," "Unknown," or other confidence level.

Node 30A may, in the example of FIG. 5, output information indicative of the confidence level (506). In some examples, node 30A may output the information indicative of the confidence level as part of a single alarm message that identifies the network alarm and the confidence level associated with the network alarm. In other examples, node 30A may output the information indicative of the confidence level in some other way. By determining a confidence level associated with the network alarm and outputting information indicative of the confidence level, node 30A may allow one or more other network devices to more efficiently address network alarms.

The techniques described in the present disclosure may be implemented, at least in part, in hardware, firmware, software, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, firmware, and software may be implemented within the same device or within separate devices to support the various operations and functions described in the present disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described herein may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
    generating, by a network device, a network alarm based on detecting that a network alarm condition of the network device has been satisfied;
    determining, by the network device, a first confidence level associated with the network alarm, the first confidence level indicating that the network alarm has been triggered but has not yet been tested;
    outputting, by the network device, a first message comprising information indicative of the network alarm and information indicative of the first confidence level;
    determining, by the network device, a second confidence level associated with the network alarm, the second confidence level indicating that the network alarm has been triggered and is being tested;
    outputting, by the network device, a second message comprising information indicative of the network alarm and information indicative of the second confidence level;
    determining, by the network device, a third confidence level associated with the network alarm, the third confidence level indicating that the network alarm has been tested and has been confirmed as valid; and
    outputting, by the network device, a third message comprising information indicative of the network alarm and information indicative of the third confidence level.

2. The method of claim 1, wherein detecting that the network alarm condition has been satisfied comprises determining a status of the network device using a first test method, and wherein determining the third confidence level associated with the network alarm comprises:
    determining the status of the network device using a second test method; and
    determining the third confidence level based on the status of the network device determined using the second test method.

3. The method of claim 1, wherein outputting the first message comprises transmitting the message to a network controller.

4. The method of claim 1, wherein, the first message includes an alarm identifier that uniquely identifies the alarm.

5. The method of claim 1, further comprising:
    subsequent to outputting the first message and by the network device, testing the alarm condition,
    wherein determining the second confidence level is based on testing the alarm condition.

6. The method of claim 1, wherein the first message specifies an identifier of the network device, an alarm type that indicates a type of the network alarm, and an identifier of a network component implicated by the network alarm.

7. The method of claim 1, wherein detecting that the alarm condition has been satisfied comprises determining that a neighboring network device is unresponsive to the network device.

8. The method of claim 7, wherein determining that the neighboring network device is unresponsive comprises determining that the neighboring network device has not responded to the network device within a predefined threshold time period.

9. The method of claim 1, wherein detecting that the network alarm condition has been satisfied comprises determining that a particular link coupled to the network device has failed.

10. The method of claim 9, wherein determining that the particular link has failed comprises determining that an amount of dropped traffic per unit time for the particular link satisfies a predefined threshold.

11. The method of claim 9, wherein the network device comprises a first network device, wherein the particular link connects the first network device to a second network device, and wherein determining the first confidence level associated with the network alarm comprises:
determining whether the first network device continues to receive status messages from the second network device; and
determining the first confidence level based at least in part on whether the first network device continues to receive the status messages.

12. The method of claim 1, further comprising:
determining, by the network device, a fourth confidence level associated with the network alarm, the fourth confidence level indicating that at least one of: the network alarm has been tested and has been confirmed as no longer valid, and the network alarm has been tested and that results of testing are inconsistent with the alarm; and
outputting, by the network device, a fourth message comprising information indicative of the network alarm and information indicative of the fourth confidence level.

13. A network device, comprising:
at least one processor; and
at least one module operable by the at least one processor to:
generate a network alarm based on detecting that a network alarm condition of the network device has been satisfied;
determine a first confidence level associated with the network alarm, the first confidence level indicating that the network alarm has been triggered but has not yet been tested;
output a first message comprising information indicative of the network alarm and information indicative of the first confidence level;
determine, by the network device, a second confidence level associated with the network alarm, the second confidence level indicating that the network alarm has been triggered and is being tested;
output, by the network device, a second message comprising information indicative of the network alarm and information indicative of the second confidence level;
determine, by the network device, a third confidence level associated with the network alarm, the third confidence level indicating that the network alarm has been tested and has been confirmed as valid; and
output, by the network device, a third message comprising information indicative of the network alarm and information indicative of the third confidence level.

14. The network device of claim 13, wherein:
the at least one module is further operable by the at least one processor to: subsequent to outputting the first message, test the alarm condition, and
wherein the at least one module operable to determine the second confidence level is based on testing the alarm condition.

15. The network device of claim 13, wherein detecting that the network alarm condition has been satisfied comprises determining a status of the network device using a first test method, and wherein the at least one module operable to determine the third confidence level associated with the network alarm is operable by the at least one processor to:
determine the status of the network device using a second test method; and
determine the third confidence level based on the status of the network device determined using the second test method.

16. A non-transitory computer-readable storage medium comprising instructions for causing a programmable processor of a network device to:
generate a network alarm based on detecting that a network alarm condition of the network device has been satisfied;
determine a first confidence level associated with the network alarm, the first confidence level indicating that the network alarm has been triggered but has not yet been tested;
output, by the network device, a first message comprising information indicative of the network alarm and information indicative of the first confidence levels;
determine a second confidence level associated with the network alarm, the second confidence level indicating that the network alarm has been triggered and is being tested;
output a second message comprising information indicative of the network alarm and information indicative of the second confidence level;
determine a third confidence level associated with the network alarm, the third confidence level indicating that the network alarm has been tested and has been confirmed as valid; and
output a third message comprising information indicative of the network alarm and information indicative of the third confidence level.

17. A method comprising:
receiving, by a controller device and from a network device, a message comprising information indicative of a network alarm generated by the network device;
determining, by the controller, a first confidence level associated with the network alarm, the first confidence level indicating that the network alarm has been triggered but has not yet been tested;
executing at least one operation based on the network alarm and the determined first confidence level;
determining, by the controller, a second confidence level associated with the network alarm, the second confidence level indicating that the network alarm has been triggered and is being tested;
executing at least one operation based on the network alarm and the determined second confidence level;
determining, by the controller, a third confidence level associated with the network alarm, the third confidence level indicating that the network alarm has been tested and has been confirmed as valid; and
executing at least one operation based on the network alarm and the determined third confidence level.

18. The method of claim 17, wherein the message further comprises information indicative of the first confidence level and wherein determining the confidence level comprises, responsive to receiving the message, determining the first confidence level based on the message.

19. The method of claim 18, further comprising:
receiving, from the network device, a second message comprising information indicative of an updated confidence level associated with the network alarm; and responsive to receiving the second message, updating the first confidence level to the second confidence level based on the second message.

20. The method of claim 19, wherein the first message and the second message both include an alarm identifier that uniquely identifies the network alarm.

21. The method of claim 19, further comprising:
responsive to receiving the first message, storing a first indication of the network alarm and the first confidence level in an alarm log; and
responsive to receiving the first message, storing a second indication of the network alarm and the second confidence level in the alarm log.

22. The method of claim 17, wherein determining the first confidence level comprises determining the first confidence level based on network testing initiated by the controller device.

23. The method of claim 17, wherein determining the first confidence level comprises:
communicating with the network device to obtain information indicating a status of the network device; and
determining the first confidence level based on the information indicating the status of the network device.

24. The method of claim 17, wherein, responsive to determining the first confidence level or the second confidence level, executing the at least one operation based on the determined first confidence level or the determined second confidence level comprises storing an indication of the network alarm in an alarm log and refraining from performing additional actions.

25. The method of claim 17, wherein determining the first confidence level associated with the network alarm is based, at least in part, on receiving the message.

26. The method of claim 17, further comprising receiving, by the controller device and from the network device, a second message comprising information indicative of the network alarm generated by the network device, wherein determining at least one of: the second confidence level and the third confidence level is based, at least in part, on receiving the second message.

27. A controller device, comprising:
at least one processor; and
at least one module operable by the at least one processor to:
receive, by the controller and from a network device, a message comprising information indicative of a network alarm generated by the network device;
determine a first confidence level associated with the network alarm, the first confidence level indicating that the network alarm has been triggered but has not yet been tested;
execute operations based on the alarm and the determined first confidence level;
determine a second confidence level associated with the network alarm, the second confidence level indicating that the network alarm has been triggered and is being tested;
execute at least one operation based on the network alarm and the determined second confidence level;
determine a third confidence level associated with the network alarm, the third confidence level indicating that the network alarm has been tested and has been confirmed as valid; and
execute at least one operation based on the network alarm and the determined third confidence level.

28. The controller device of claim 27, wherein the message further comprises information indicative of the first confidence level, and wherein the at least one module operable to determine the first confidence level is operable by the at least one processor to determine the first confidence level specified by the message.

29. The controller device of claim 27, wherein the at least one module operable to determine the second confidence level is operable by the at least one processor to determine the second confidence level based on network testing initiated by the controller device.

30. The controller device of claim 27, wherein the at least one module operable to determine the first confidence level is operable by the at least one processor to:
communicate with the network device to obtain information indicating a status of the network device; and
determine the first confidence level based on the information indicating the status of the network device.

* * * * *